United States Patent [19]
Suzuki et al.

[11] Patent Number: 5,416,603
[45] Date of Patent: May 16, 1995

[54] IMAGE SEGMENTATION USING DISCRETE COSINE TRANSFER DATA, AND IMAGE DATA TRANSMISSION APPARATUS AND METHOD USING THIS IMAGE SEGMENTATION

[75] Inventors: Koichi Suzuki, Yokohama; Noboru Murayama, Machida, both of Japan

[73] Assignee: Ricoh Company, Ltd., Tokyo, Japan

[21] Appl. No.: 873,754

[22] Filed: Apr. 27, 1992

[30] Foreign Application Priority Data

Apr. 30, 1991 [JP] Japan .................................. 3-098636

[51] Int. Cl.⁶ ............................................. H04N 1/415
[52] U.S. Cl. ...................................... 358/426; 358/433
[58] Field of Search ............... 358/426, 261.2, 261.3, 358/261.1, 430, 432, 433, 11, 12, 16, 401

[56] References Cited

U.S. PATENT DOCUMENTS

| | | | |
|---|---|---|---|
| 5,070,402 | 12/1991 | Ishii et al. | 358/135 |
| 5,070,532 | 12/1991 | Faul et al. | 358/433 X |
| 5,093,714 | 3/1992 | Hashimoto | 358/11 |
| 5,097,320 | 3/1992 | Wilkinson | 358/12 |
| 5,162,923 | 11/1992 | Yoshida et al. | 358/433 |
| 5,196,933 | 3/1993 | Henot | 358/136 |
| 5,241,395 | 8/1993 | Chen | 358/261.3 |

*Primary Examiner*—Bentsu Ro
*Attorney, Agent, or Firm*—Popham, Haik, Schnobrich & Kaufman, Ltd.

[57] ABSTRACT

An image-data transmitter, applicable to a FAX and an image file apparatus, receives image data including a plurality of image-data portions, and identifies the image data for each image-data portion so as to detect a kind of image data for each image-data portion, such as a binary image and a multilevel image. Then the image-data transmitter codes the image data for each image-data portion in accordance with a coding scheme corresponding to the kind of image data of the image-data portion. Thus, a coding efficiency and an image quality of a restored image are not so much degraded.

11 Claims, 8 Drawing Sheets

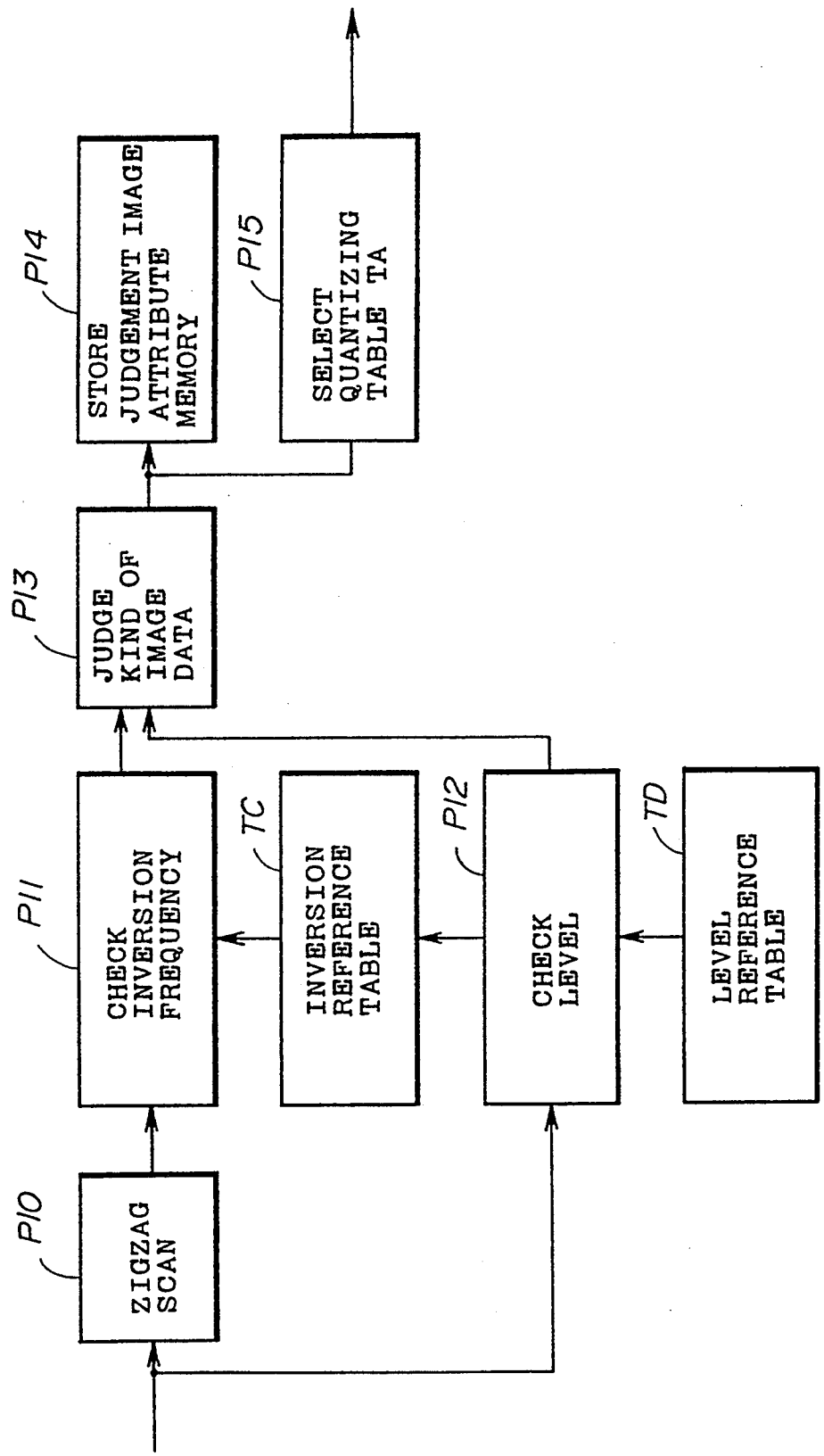

IMAGE SEGMENTATION USING DISCRETE COSINE TRANSFER DATA, AND IMAGE DATA TRANSMISSION APPARATUS AND METHOD USING THIS IMAGE SEGMENTATION

BACKGROUND OF THE INVENTION

The present invention relates generally to image-data transmitters, and more particularly to an image-data transmitter which transmits a blend of binary and multi-level images to an external apparatus via a channel. The present invention is especially suitable for a facsimile apparatus (abbreviated FAX hereinafter), and an image filing apparatus.

A modified READ coding scheme (abbreviated MR hereinafter), a modified Huffman coding scheme (abbreviated MH hereinafter), and a modified MR coding scheme (abbreviated MMR hereinafter) are often used to code a binary image, such as a character image; the MH is used for a group 3 (abbreviated G3 hereinafter) FAX, and the MMR is used for a group 4 (abbreviated G4 hereinafter) FAX. In addition, a new coding scheme designed to perform a progressive build-up indication for a soft copy communication, in which a whole binary image is roughly indicated first and an image quality thereof becomes gradually improved, has been proposed recently.

On the other hand, a discrete cosine transform (abbreviated DCT hereinafter) coding scheme is often used to code a continuous multilevel image, such as a color image. As an example of a DCT coding scheme, a base-line system using a color still picture DCT coding scheme is well-known. As shown in FIG. 1, according to the system, a target image is segmented into a plurality of blocks, each consisting of n*n (typically 8*8) picture elements (abbreviated pixels hereinafter). Each block is coded in accordance with a two-dimensional (abbreviated 2D hereinafter) DCT coding scheme (in step P1). Then, the obtained n*n DCT coefficients are divided by n*n thresholds stored in a quantizing table TA (in step P2). Each of the DCT coefficients $F_{uv}$ (u, v=0, 1, 2, ..., n−1) represents a spatial frequency component for each block of image data; in particular, a coefficient $F_{00}$ represents a DC component of the spatial frequency proportional to an average value of n,n pixels, and another coefficients represents an AC component thereof, the coefficient becoming high as variables u and v become large. Next, a difference between a DC component of an arbitrary block and that of a block prior to the arbitrary block is calculated (in step P3), and then Huffman-coded with reference to a Huffman code table TB (in step P4). On the other hand, each AC component is zigzag-scanned as shown in FIG. 2 so as to be converted into a one-dimensional (abbreviated 1D hereinafter) series (in step P5). Then two-dimensional Huffman coding is performed, with reference to the table TB, for data generated as a result of coding a run length of zero data and a bit number of a valid coefficient (in step P6). After all the blocks are processed, a coding operation is terminated.

However, image data including a blend of a multilevel image depending on tone and a binary image depending on resolution is compression-oriented-coded in a single mode, a coding efficiency and an image quality of a restored image are much degraded.

SUMMARY OF THE INVENTION

Accordingly, it is a general object of the present invention to provide a novel and useful image-data transmitter in which the above disadvantages are eliminated.

Another, more specific object of the present invention is to provide an image-data transmitter which performs different coding operations for respectively different kinds of image data.

With the foregoing in mind, an image-data transmitter according to the present invention comprises image identifying means for receiving image data including a plurality of image-data portions, and for identifying the image data for each image-data portion so as to detect a kind of image data for each image-data portion, encoding means, coupled to the image identifying means and compatible with plural kinds of coding schemes corresponding to a number of kinds of image data of the image-data portions, for coding the image data for each image-data portion in accordance with a corresponding one of the plural kinds of coding schemes, and channel-control means, coupled to a channel and the encoding means, for controlling transmission of the image data to an external apparatus via the channel.

In addition, the present invention provides a method for transmitting image-data including a plurality of image-data portions to an external apparatus via a channel, which method comprises the steps of identifying the image data for each image-data portion so as to detect a kind of image data for each image-data portion, coding the image data for each image-data portion in accordance with a coding scheme corresponding to the kind of image data of the image data portion, and controlling transmission of the image data to the external apparatus via the channel.

According to the present invention, due to the image identifying means and the encoding means, each kind of image-data is coded in accordance with a desired coding scheme. Thus, a coding efficiency and an image quality of a restored image are not degraded as much as those in conventional technology.

Other objects and further features of the present invention will become apparent from the detailed description when read in conjunction with the accompanying drawings.

BRIEF DESCRIPTION OF THE DRAWINGS

FIG. 5 shows a block diagram for explaining in detail an image identification procedure performed at one of steps of the flow chart shown in FIG. 4;

DETAILED DESCRIPTION OF PREFERRED EMBODIMENTS

Figure 3:
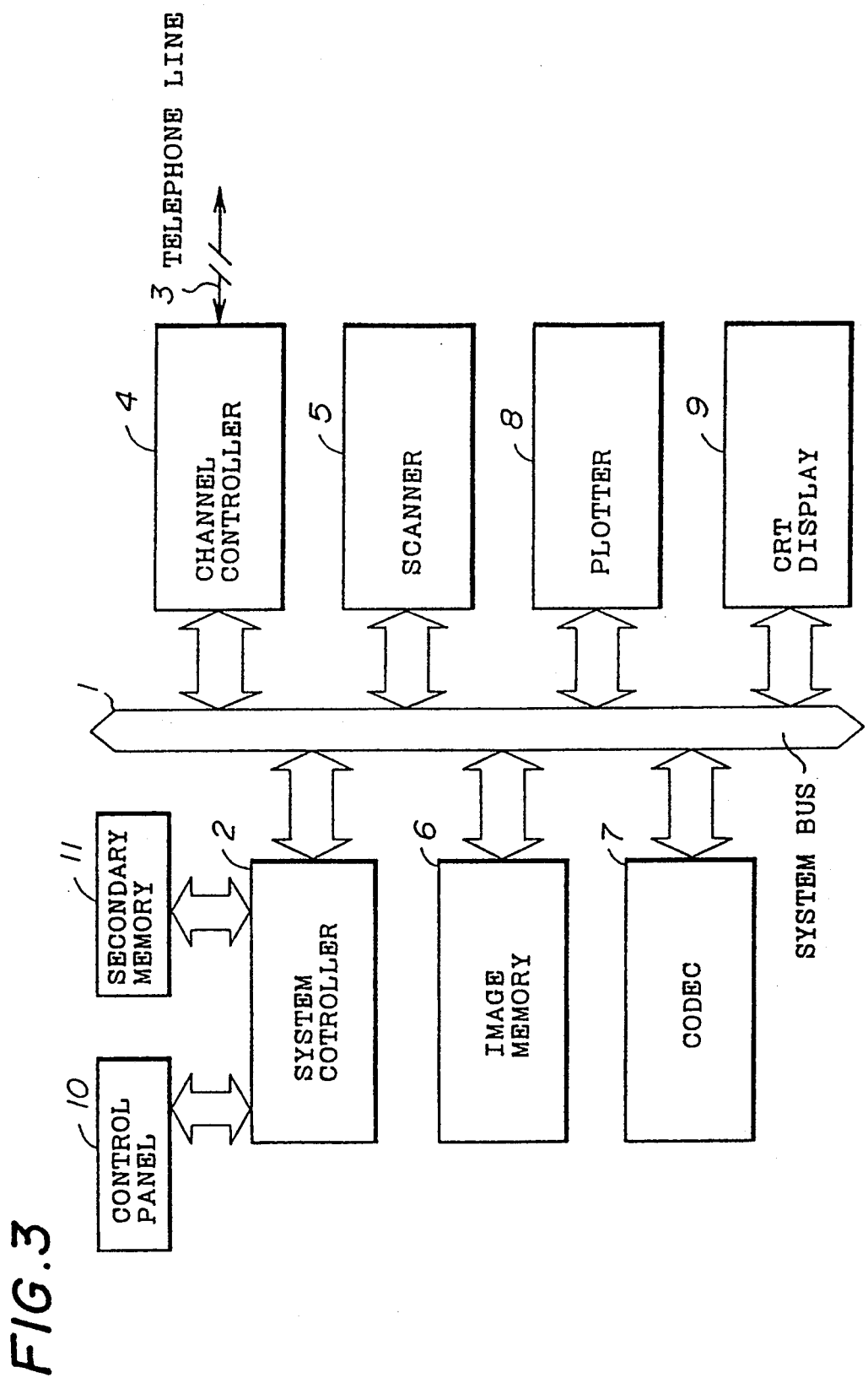
FIG. 3 shows a block diagram of a FAX according to the present invention.

FIG. 3 shows a FAX to which an image-data transmitter according to the present invention is applied. The FAX shown in FIG. 3 comprises a system controller 2, a channel controller 4, a scanner 5, an image memory 6, a coder and decoder (abbreviated CODEC hereinafter) 7, a plotter 8, a cathode ray tube (abbreviated CRT hereinafter) display 9, a control panel 10, and a secondary memory 11. The system controller 2, channel controller 4, scanner 5, image memory 6, CODEC 7, plotter 8, and CRT display 9 are coupled to each other via a system bus 1. In addition, the system controller 2 is coupled to the control panel 10 and the secondary memory 11. Moreover, the channel controller 4 is coupled to a telephone line 3.

The system controller 2 controls operations of each element of the FAX. The channel controller 4, comprising an ISDN interface, which performs a circuit-switched connection between the FAX and an external apparatus via the telephone line 3, and transmits/receives compression-oriented-coded image data to/from the external apparatus. The scanner 5 generates image data by scanning a predetermined image with predetermined resolution. The image memory 6 stores various image data.

Figure 1:
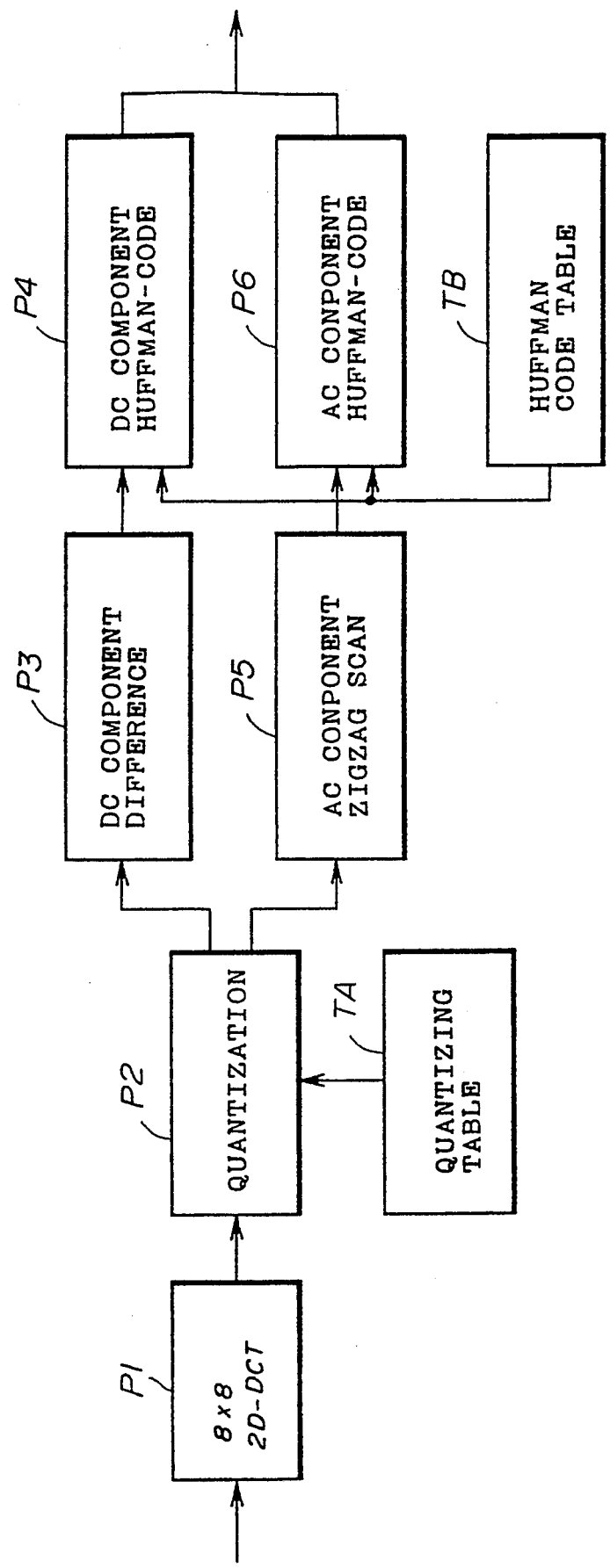
FIG. 1 shows a view for explaining an operation of a conventional base-line system.

The CODEC 7 codes the image data generated by the scanner 5, and decodes image data transmitted from the external apparatus via the channel controller 4. The CODEC 7 includes a plurality of CODEC parts each using a different coding scheme; a color still picture CODEC part using a DCT coding scheme for a continuous multilevel image, a Q CODEC part is used for a dot-map image, MH, MR, and MMR CODEC parts are used for a character image. These coding schemes are well-known, and thus a description thereof will be omitted. The CODEC 7 further includes therein the quantizing table TA shown in FIG. 1, an inversion reference detecting table TC, a level reference table TD, an image-attribute memory, and a discriminative color table, which will be described later. However, these tables may be provided independent of the CODEC 7.

The plotter 8 plots out an input image or a processed image. The CRT display 9 indicates the input image or the processed image on a display unit. Thus, the CRT display 9 indicates image data stored in the image memory 6. The control panel 10 includes operating elements for controlling this system and an indicator for indicating a system condition. An operator of the FAX inputs a predetermined command to the FAX via the control panel 10. The secondary memory 11 stores various data used for the system controller 2.

Figure 4:
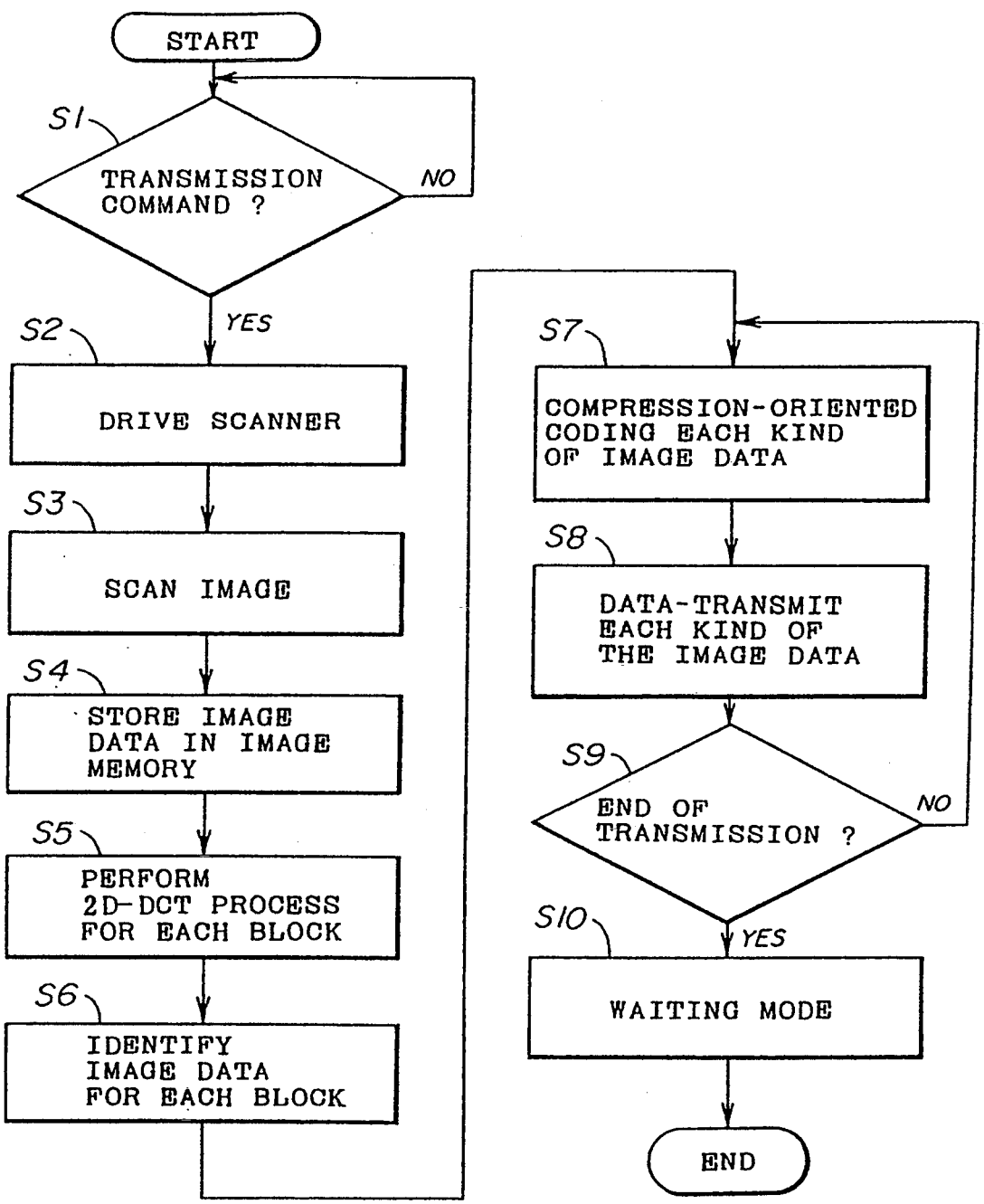
FIG. 4 shows a flow chart for explaining a transmission operation executed by the FAX shown in FIG. 3.

Next follows, with reference to FIG. 4, a description of a transmission operation of the FAX.

When the system controller 2 detects a transmission command input by an operator via the control panel 10 (in step S1), the controller 2 drives the scanner 5 (in step S2) and thus the scanner 5 generates image data by scanning a predetermined image on a document (in step S3). As a result, the scanner 5 stores every 8-bit string of RGB signal corresponding to the image data in the image memory 6 (in step S4), and the image data stored in the image memory 6 is indicated on the CRT display 9. Next, the system controller 2 transmits the image data stored in the image memory 6 to the CODEC 7. In response, the CODEC 7 segments the image data into a plurality of blocks, and performs a 2D-DCT process for each block of image data (in step S5). Subsequently, the CODEC 7 identifies the image data so as to detect, for each block, its kind, and generate each corresponding kind of image plane (in step S6). Incidentally, rather than using the CODEC 7 to identify the image data, the FAX may further comprise image identifying means for identifying the image data.

Figure 2:
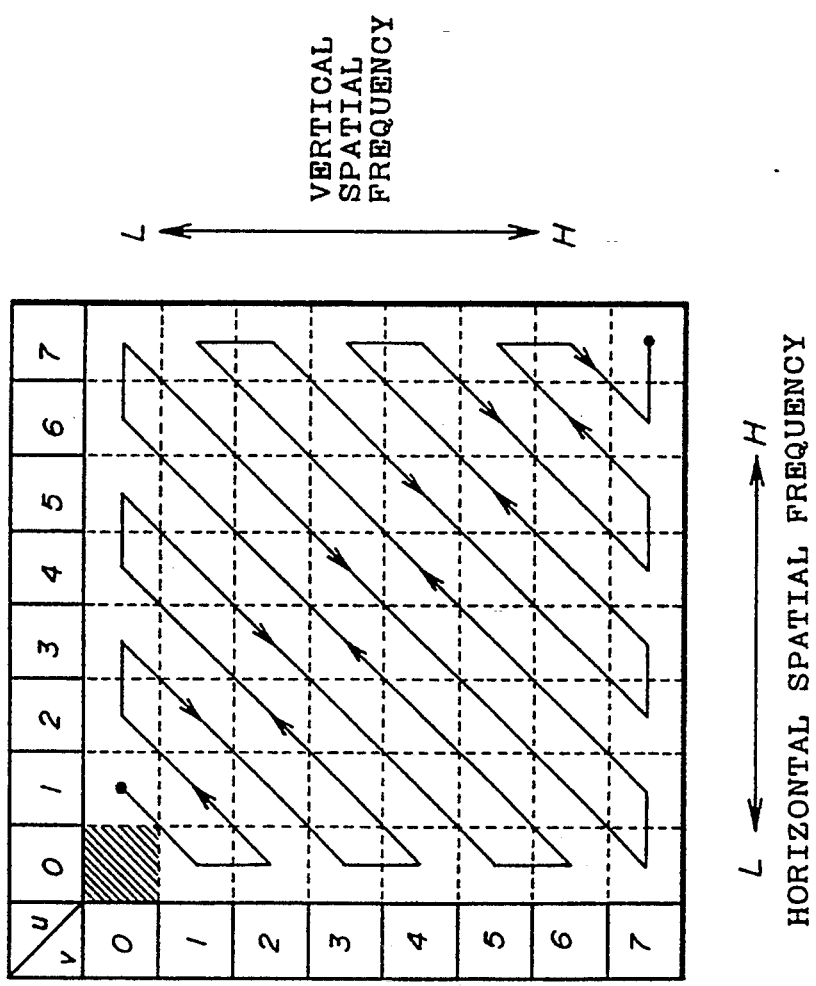
FIG. 2 shows a view for explaining a zigzag scan performed by the base-line system shown in FIG. 1.
Figure 6A:
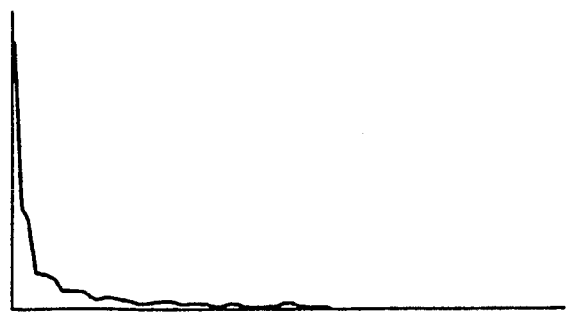
FIG. 6A shows a typical continuous multilevel image (a human picture)
Figure 6B:
FIG. 6B shows a pseudo gray scale image shown in FIG. 6A (a dot-map picture)
Figure 6C:
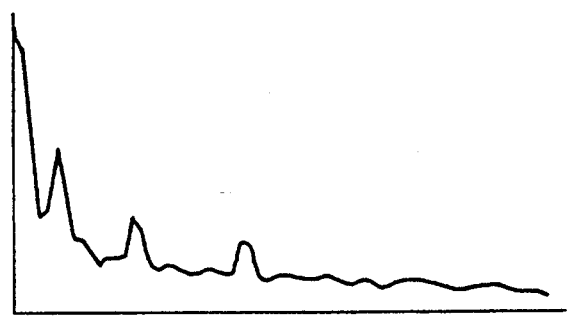
FIG. 6C shows a multilevel image of a complicated design including many high-frequency components.
Figure 6D:
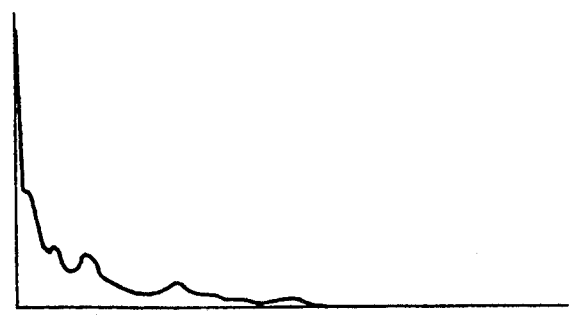
FIG. 6D shows a character image.

Next follows, with reference to FIGS. 5 and 6A to 6D, a detailed description of the image identification procedure in step S6. First, a zigzag scan is performed for the image data which was DCT-processed in step S5, so as to convert DCT coefficients of AC components into 1D series (in step P10). This procedure is the same as the step P5 shown in FIGS. 1 and 2, and a description thereof will be omitted. As a result, the 1D DCT coefficients are expressed as a spectrum distribution, for example, as shown in FIG. 6A to 6D. FIGS. 6A to 6D respectively indicate four different kinds of image data. FIG. 6A shows a typical continuous multilevel image, such as a human picture. FIG. 6B shows a pseudo gray scale image of the picture shown in FIG. 6A, such as a dot-map picture. FIG. 6C shows a multilevel image of a complicated design including many high-frequency components. FIG. 6D shows a character image. In FIGS. 6A to 6D, each vertical axis represents a DC component, and each horizontal axis represents a frequency level. As shown in FIGS. 6A to 6D, the kind of each image data can be identified by checking a number of changes of the coefficients (an inversion frequency) at a low-frequency region and a level at a high-frequency region. Thus, the CODEC 7 checks the inversion frequency in the low-frequency region (in step P11) by using the inversion reference table TC storing thresholds of the inversion frequency, each of which corresponds to each kind of image data, and the level at the high-frequency region (in step P12) by using the level reference table TD storing thresholds of the level, each of which corresponds to each kind of image data. Then the CODEC 7 judges the kind of image data based on results in steps P11 and P12 (in step P13). The judgment result is stored in the image-attribute memory in the CODEC 7 (in step P14). If the image data represents a multilevel image and is to be coded in accordance with the DCT coding scheme, one of the quantizing tables TA in the aforementioned base-line system is selected so as to determine a threshold matrix suitable for the multilevel image (in step P15).

Referring back to FIG. 4, each kind of image plane is then compression-oriented-coded (in step S7), and transmitted to the external apparatus via the channel controller 4 and the telephone line 3 (in step S8). When all the image data is completely transmitted (in step S9), the system controller 2 informs the control panel 10 of the termination, and assumes the waiting mode so as to terminate the transmission operation (in step S10).

Figure 7:
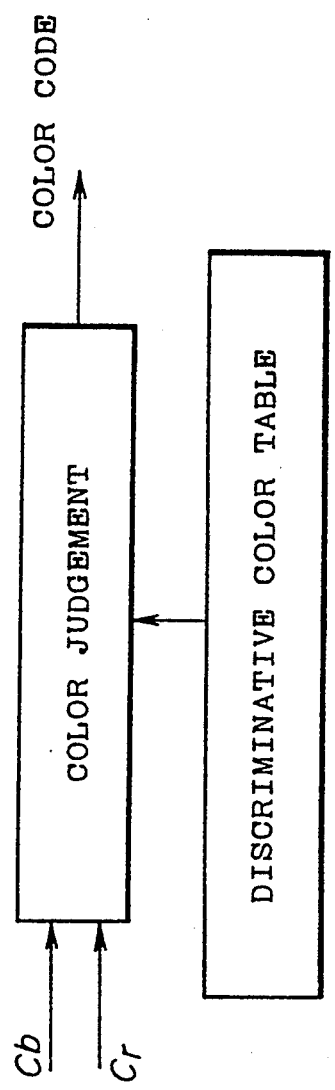
FIG. 7 shows a view for explaining how the FAX shown in FIG. 3 judges a color of a character image.

If the image data represents a character image, a color of the character image is determined, with reference to color difference data, as follows: If the color is close to achromatic, it is regarded as black. Otherwise, it is specified as a color close to that of the character image. The color of the character image is easily determined based on the color difference signals Cb and Cr of the image data, as shown in FIG. 7. In FIG. 7, the discriminative color table correlates a pair of color difference signals Cb and Cr with a color code representing the color of the character image. Thus, the CODEC 7 can judge the color of the character image from the discriminative color table. Then the CODEC 7 stores the color code in the image-attribute memory therein.

Figure 8:
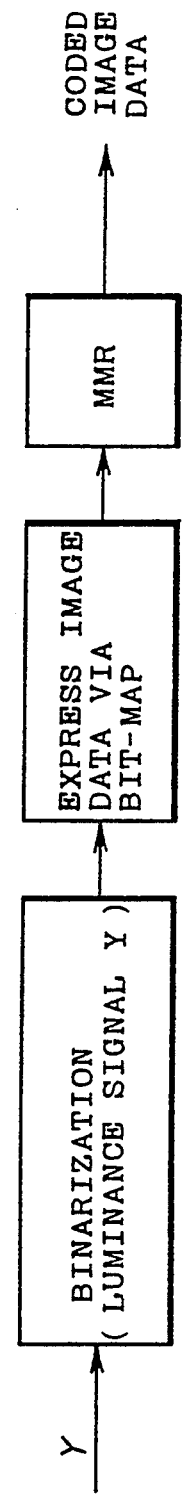
FIG. 8 shows a view for showing how the FAX shown in FIG. 3 judges a shape of the character image.

On the other hand, a shape of the character image is determined from a luminance signal Y of the image data. As shown in FIG. 8, the image data is first binarized based on the luminance signal Y, and then the character image is expressed via a bit map based on the binarized result. Subsequently, each character block density is detected so that a high density area thereof can be regarded as the character image and expressed as one large block. Since one bit corresponds to 8*8 pixels of the original image, a memory having a small storage can be used. When the large block is generated, the bit map is segmented into p*q meshes each having, for example, 4*4 bits, so as to count every mesh of target bits; i.e., if there are more than 8 bits in an arbitrary mesh, the arbitrary mesh is corrected so as to be treated as a bit representing the character block, and filtered so as to correct its attributes.

Thus, a color attribute is checked for each large block of a character area. In case of concentrated color distribution, an average color block is regarded as the color of the character image. However, if a remarkably different color group is included, the character image is regarded to be colored by two different colors and the character image is divided into the different colors of the character image. During a transmission operation, a pair of a discriminative code and luminance code may be transmitted to the external apparatus. Instead of dividing the character image into the different colors of the character image, a luminance data and a color code may be transmitted to the external apparatus.

Figure 9:
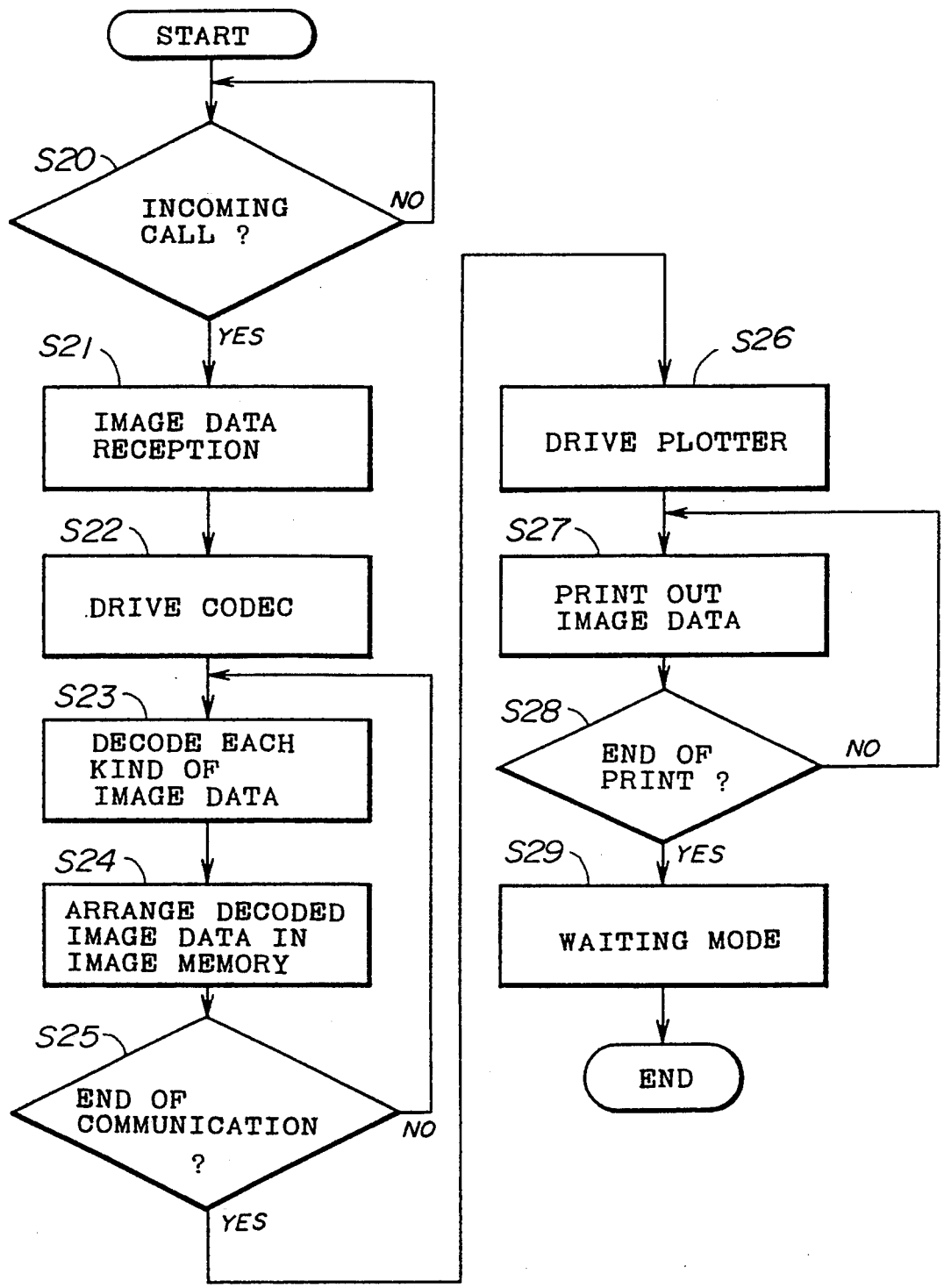
FIG. 9 shows a flow chart for explaining a reception operation executed by the FAX shown in FIG. 3.

Next follows, with reference to FIG. 9, a description of a reception operation of the FAX. When the channel controller 4 receives an incoming call from the external apparatus via the telephone line 3 (in step S20), the channel controller 4 informs the system controller 2 of it while receiving the image data (in step S21). The system controller 2 instructs the control panel 10 to indicate that the FAX is receiving the image data, and the system controller 2 drives the CODEC 7 (in step S22). The CODEC 7 starts to decode each kind of image data (in step S23), and arranges it in the image memory 6 (in step S24). When the communication is terminated (in step S25) and each kind of image data is completely arranged in the image memory 6, the system controller 2 drives the plotter 8 (in step S26) so as to print out the image data stored in the image memory 6 (in step S27). When all the image data is printed out (in step S28), the system controller 2 informs the control panel 10 of the termination and becomes a waiting mode so as to terminate the reception operation.

Further, the present invention is not limited to these preferred embodiments, and various variations and modifications may be made without departing from the scope of the present invention.

What is claimed is:

1. An image data transmitter, comprising:
   a) image segmentation means for receiving image data including a plurality of image-data portions, and for segmenting the image data for each image-data portion so as to detect a kind of image data for each image-data portion, the image segmentation means including:
      1) first means for performing a discrete cosine transformation on each block of image data, so as to provide discrete cosine transformed data for each block;
      2) second means for determining the kind of image for each block of image data based on the discrete cosine transformed data, so as to arrive at a determination result; and
      3) third means for segmenting the image data into portions representative of different kinds of images, based on the determination result;
   b) encoding means, coupled to said image segmentation means and compatible with plural kinds of coding schemes corresponding to a number of kinds of image data of the image-data portions, for coding the image data for each image-data portion in accordance with a corresponding one of the plural kinds of coding schemes, wherein said encoding means includes:
      1) means for determining a color of a character image from two color difference signals of the image data if the image data represents a character image; and
   c) control means, coupled to said encoding means, for controlling transmission of the image data to an external apparatus.

2. The image data transmitter of claim 1, wherein the image segmentation means includes:
   1) means for performing a discrete cosine transformation for each image-data portion so as to obtain a spectrum distribution of a discrete cosine coefficient thereof; and
   2) means for judging the kind of image data of each image-data portion by evaluating a level and an inversion frequency of said spectrum distribution.

3. The image data transmitter of claim 1, wherein:
   the image data transmitter comprises a facsimile apparatus capable of being coupled to an integrated services digital network.

4. An image data transmitter comprising:
   a) image segmentation means for receiving image data including a plurality of image-data portions, and for segmenting the image data for each image-data portion so as to detect a kind of image data for each image-data portion, the image segmentation means including:
      1) first means for performing a discrete cosine transformation on each block of image data, so as to provide discrete cosine transformed data for each block;
      2) second means for determining the kind of image for each block of image data based on the discrete cosine transformed data, so as to arrive at a determination result; and
      3) third means for segmenting the image data into portions representative of different kinds of images, based on the determination result;
   b) encoding means, coupled to said image segmentation means and compatible with plural kinds of coding schemes corresponding to a number of kinds of image data of the image-data portions, for coding the image data for each image-data portion in accordance with a corresponding one of the plural kinds of coding schemes, wherein, if the image data represents a character image, wherein said encoding means includes:

1) means for specifying a shape of the character image by binarizing the image data based on a luminance signal thereof; and
2) means for coding the specified shape of the character image; and c) control means, coupled to said encoding means, for controlling transmission of the image data to an external apparatus.

5. The image data transmitter of claim 4, wherein the image segmentation means includes:
1) means for performing a discrete cosine transformation for each image-data portion so as to obtain a spectrum distribution of a discrete cosine coefficient thereof; and
2) means for judging the kind of image data of each image-data portion by evaluating a level and an inversion frequency of said spectrum distribution.

6. The image data transmitter of claim 4, wherein:
the image data transmitter comprises a facsimile apparatus capable of being coupled to an integrated services digital network.

7. An image data transmitter, comprising:
a) image segmentation means for receiving image data including a plurality of image-data portions, and for segmenting the image data for each image-data portion so as to detect a kind of image data for each image-data portion, the image segmentation means including:
1) first means for performing a discrete cosine transformation on each block of image data, so as to provide discrete cosine transformed data for each block;
2) second means for determining the kind of image for each block of image data based on the discrete cosine transformed data, so as to arrive at a determination result; and
3) third means for segmenting the image data into portions representative of different kinds of images, based on the determination result;
b) encoding means, coupled to said image segmentation means and compatible with plural kinds of coding schemes corresponding to a number of kinds of image data of the image-data portions, for coding the image data for each image-data portion in accordance with a corresponding one of the plural kinds of coding schemes, wherein said encoding means includes:
1) means for using a still picture coding scheme using a discrete cosine conversion, so as to obtain a discrete cosine conversion coefficient of the image data for each image-data portion;
2) a quantizing memory for storing a plurality of thresholds corresponding to a number of kinds of image data of the image-data portions; and
3) means for dividing the discrete cosine conversion coefficient by a corresponding one of the thresholds; and c) control means, coupled to said encoding means, for controlling transmission of the image data to an external apparatus.

8. The image data transmitter of claim 7, wherein the image segmentation means includes:
1) means for performing a discrete cosine transformation for each image-data portion so as to obtain a spectrum distribution of a discrete cosine coefficient thereof; and
2) means for judging the kind of image data of each image-data portion by evaluating a level and an inversion frequency of said spectrum distribution.

9. The image data transmitter of claim 7, wherein:
the image data transmitter comprises a facsimile apparatus capable of being coupled to an integrated services digital network.

10. A method for transmitting image-data including a plurality of image-data portions to an external apparatus, said method comprising the steps of:
a) segmenting the image data for each image-data portion so as to detect a kind of image data for each image-data portion, the segmenting step including the steps of:
1) performing a discrete cosine transformation on each block of image data, so as to provide discrete cosine transformed data for each block;
2) determining the kind of image for each block of image data based on the discrete cosine transformed data, so as to arrive at a determination result; and
3) segmenting the image data into portions representative of different kinds of images, based on the determination result;
b) coding the image data for each image-data portion in accordance with a coding scheme corresponding to the kind of image data of the image data portion, wherein said step of coding the image data includes:
1) coding data representing a shape of a character image and transmitting coded image data to the external apparatus with data representing a color of the character image, if the image data represents a character image; and
c) transmitting the image data to the external apparatus.

11. A method according to claim 10, wherein, if the image data represents a character image including a plurality of colors, the step of transmitting the image data includes:
transmitting the image data for each color of the character image.

* * * * *